United States Patent Office 2,908,627
Patented Oct. 13, 1959

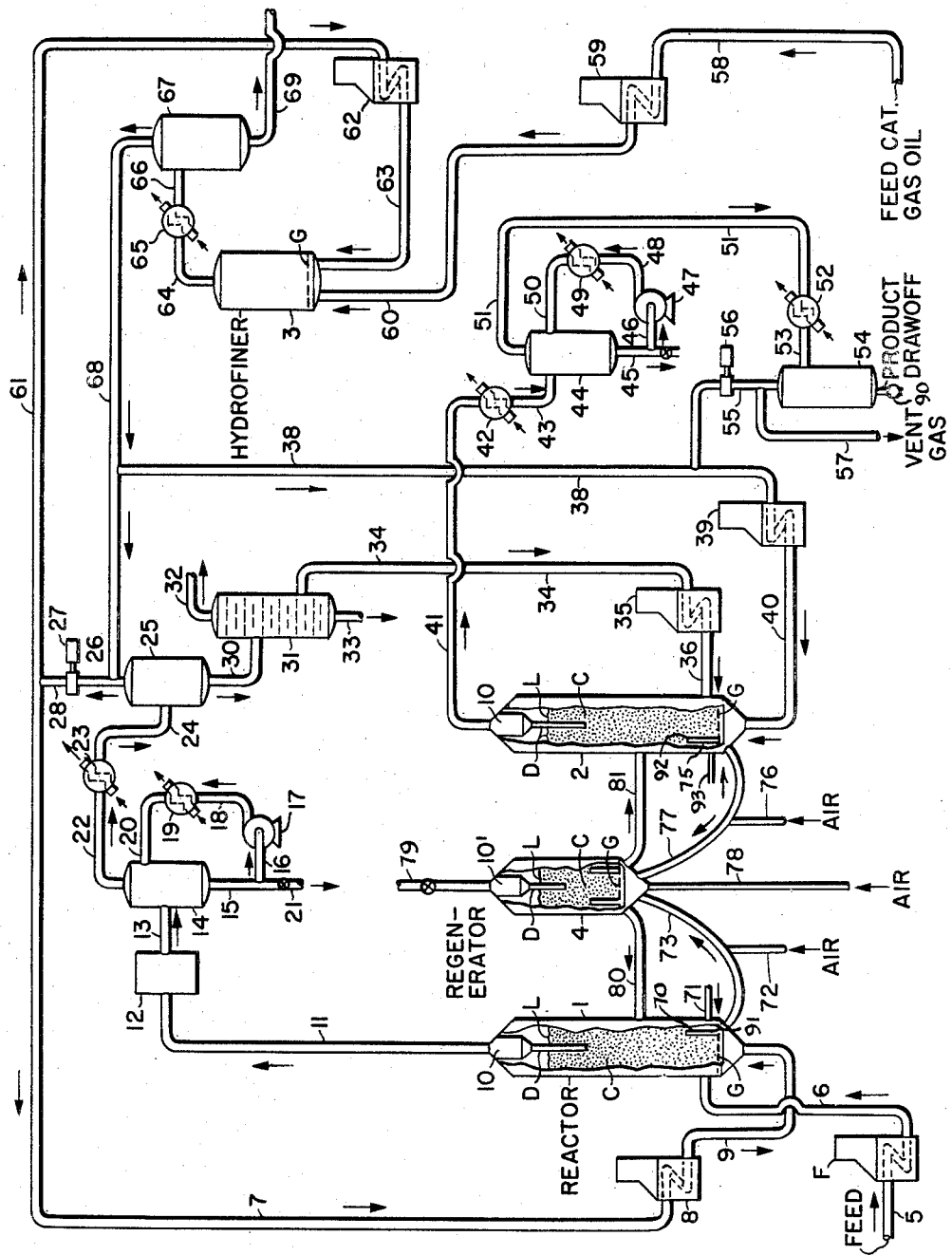

2,908,627

PROCESS FOR HYDROFINING AND HYDRO-
FORMING HYDROCARBONS

Charles E. Hemminger, Westfield, N.J., assignor to Esso
Research and Engineering Company, a corporation of
Delaware Continuation of application Serial No. 447,133, August
2, 1954. This application February 3, 1958, Serial No.
713,055

5 Claims. (Cl. 208—64)

This is a continuation of application Serial Number 447,133 filed August 2, 1954 for "Process For Hydrofining and Hydroforming Hydrocarbons," now abandoned.

The present invention relates to improvements in hydroforming. More particularly, the present invention relates to improvements in hydroforming employing a fluidized bed of catalyst in which the feed stock contains sulfur, and the invention provides means for effectively dealing with such a sulfur-containing stock in a manner which is efficient and less expensive than those previously proposed. The hydroforming of naphthas to produce a product of improved octane quality is a matter of record and commercial practice. Hydroforming is usually defined as an operation in which naphthas, that is to say, virgin naphtha, cracked naphtha, or naphthas from destructive hydrogenation are treated at elevated temperatures and pressures in the presence of a solid catalytic material and in the presence of hydrogen. For best results the naphtha feed should contain appreciable quantities of naphthenes, which naphthenes undergo dehydrogenation to form the corresponding aromatic hydrocarbons, and this dehydrogenation of naphthenes constitutes one of the important reactions that occur in hydroforming. However, other reactions occur including isomerization of normal paraffins and isomerization of alkyl substituted 5-carbon rings such as dimethylcyclo pentane to form methylcyclohexane. Also, there is some hydrocracking of heavier paraffins to form lower boiling paraffins. There may also occur during hydroforming, aromatization of paraffins, such as normal heptane, first, to form methylcyclohexane, which latter compound is then converted by dehydrogenation to toluene. Hydrogenation of olefinic hydrocarbons and removal of sulfur also occur.

The catalysts usually recommended for use in the hydroforming operation are of two general classes, first, platinum group metals, such as supported platinum or palladium. The second group of catalysts recommended for hydroforming and actually used therein constitute oxides or sulfides of metals of the IV, V and VI group of the periodic system.

In the noble metal class of catalysts, it is pointed out that a good catalyst contains, say, from .01–0.5 wt. percent platinum carried on an active form of alumina, which alumina, of course, will constitute over 99% of catalyst composition. It has also been found that a small amount of chlorine or other halogen increases the efficiency of this platinum catalyst since it adds to its hydrocracking activity.

Now, with respect to the base metal class of catalyst, a good catalyst is one containing 5–10 wt. percent of molybdenum oxide carried on 90–95 wt. percent of an active form of alumina. In the interest of heat stability, the molybdenum oxide-containing catalyst contains from 0.3–7.0 wt. percent of silica, based on the total weight of the catalyst composition.

In brief compass, the present invention is an integrated hydroforming operation carried out stagewise in the presence of fluidized beds of catalyst, such as molybdenum oxide on alumina further characterized in that the process is adapted to treat other hydrocarbon oils such as sulfur bearing gas oil to desulfurize the same, and at the same time to saturate olefins which may be associated therewith, or subject the said gas oil to a controlled degree of destructive hydrogenation to form high quality diesel oil, kerosene and domestic heating fuels.

The main object of the present invention, therefore, is to carry out a combined process which involves hydroforming of naphthas with the production of excess hydrogen of high purity, which hydrogen may then be used to treat in the presence of a catalyst, a second oil, such as may contain sulfur and olefinic material to produce saleable material, in a manner which is cheaper than the processes in this field previously proposed.

Another object of the present invention is to utilize the hydrogen produced in the hydroforming operation to treat a sulfur bearing stock in the presence of a catalyst such as cobalt molybdate carried on alumina and to free the system of sulfur released during the hydroforming of the said oil in a manner which is efficient and may be performed by means effecting important economies.

Another object of the present invention is to desulfurize sulfur bearing oils in conjunction with a hydroforming operation which produces a high purity hydrogen, which is used to treat said sulfur bearing oils and to provide means which will effect economies in the operation such as the elimination of gas scrubbing equipment to remove a sulfur bearing material.

Another object of the present invention is to provide a hydroforming operation adapted to treat high sulfur naphthas in a manner which is economical and efficient.

Another object of the present invention is to provide an efficient means for regenerating the catalyst.

Other and further objects of the present invention will appear in the following description and claims.

In the accompanying drawing there is shown, diagrammatically, the principal parts of an apparatus layout in which a preferred modification of the present invention may be carried into effect.

Similar reference characters refer to similar parts.

Referring in detail to the drawing, 1 represents a hydroforming reactor containing a fluidized bed of catalyst C extending from a grid or other foraminous member G to an upper dense phase level L. 2 represents a second hydroforming reactor also containing a fluidized bed of catalyst C extending from a grid or foraminous member G to an upper dense phase level L. 3 represents a hydrogenation reactor also containing a fixed bed of catalyst supported by grid G. 4 represents a catalyst regeneration zone wherein catalyst contaminated with carbon and sulfur compounds is formed into a fluidized bed C extending from a grid G to an upper dense phase level L, and in that form treated with an oxygen-containing gas to burn off the contaminating deposits.

In operation, a naphtha feed enters the present system through line 5 and thence is charged to a furnace F where it is vaporized and heated to a temperature of, say, about 1000° F. It will be appreciated that the feed oil in line 5 is not a cold oil but is one which has been preheated by the hot products of this system in equipment not shown. The vaporized oil is withdrawn through furnace F, through line 6 and charged to hydroformer 1, and it will be noted that it is charged to a lower point in the hydroformer, but above the gas distributing means G. Simultaneously, a hydrogen-containing gas obtained from the product recovery system is charged via line 7 to a furnace 8 wherein it is heated to a temperature of about 1000°–1250° F. and thence withdrawn through line 9 and charged into the bottom of hydroformer 1 below the gas distributing means G. Under conditions of temperature, pressure and contact time more fully set forth hereinafter, the desired hydroforming conversion occurs and the raw product and hydrogen pass from the bed of catalyst C through a disengaging space in the upper portion of hydroformer 1 extending from L to the top of the reactor. In this disengaging space the major portion of the catalyst is separated from the gasiform material and gravitates toward the bed of catalyst C. The gasiform material, however, will contain catalyst still entrained therein as it is about to pass from reactor 1, and to remove this entrained catalyst, the gasiform material is passed through one or more "cyclones" 10 (or other solids-gas separating devices) and returned to the bed of catalyst through one or more dip pipes D. The vaporiform material containing the raw hydroformate, hydrogen and normally gaseous hydrocarbons pass from reactor 1, through line 11, are cooled in heat exchanger 12 by heat interchange with feed (by means not illustrated) to a temperature of about 750° F., thence pass via line 13 into a scrubber 14. In this scrubber heavy polymer containing entrained catalyst is withdrawn through line 15. A portion of this heavy polymer which amounts to approximately 2% of the total product is recycled via line 16, pump 17, line 18, cooler 19 and line 20 to the said scrubber 14. The temperature prevailing in scrubber 14 is about 500° F. A portion of the heavy polymer is withdrawn from the system through line 21. The overhead product from scrubber 14 passes via line 22 through a condenser 23 and line 24 into a separator 25. Recycle gas from separator 25, that is to say, gas containing principally hydrogen, is withdrawn through line 26, thence passed through compressor 27, thence recycled via line 28 to line 7 and recycled through furnace 8 and line 9 to the hydroforming reactor 1. The liquid product in separator 25 is withdrawn through line 30 and charged to a distillation column 31. From distillation column 31, a product is taken overhead through line 32. This fraction boils up to 225° F. and contains light hydrocarbons as propane and butane which are not carried overhead from separator 25 in line 26. It is a final product and is delivered to product storage for blending in finished gasoline.

A bottoms fraction is recovered from fractional distillation column 31 through line 33. These bottoms boil above about 300° F. and are piped to product tanks for blending with finished gasolines. The cut point for the bottoms should be about 15°–35° F. lower than the Engler 95% of the naphtha feed to the reactor 1 through line 5.

A heart cut is withdrawn from fractional distillation column 31, through line 34 and charged to a reheating furnace 35 where it is heated to a temperature of 950°–1050° F., and thence charged to hydroforming reactor 2 via line 36 at a point in the lower portion of the bed of catalyst C, but above the grid G. Simultaneously, hydrogen-containing gas in line 55 is withdrawn through pump 56, thence passed through line 38 and furnace 39 wherein it is heated to a temperature of from about 1100° to 1250° F., thence passed via line 40 into the bottom portion of hydroforming reactor 2 at a point below the grid G. In reactor 2 the heart cut of the product from reactor 1, which heart cut boils within the range of from about 225° to 300° F., is subjected to more severe conditions than those existing in reactor 1 as will subsequently be explained. The hydroformed product passes from the bed of catalyst C into a disengaging space disposed between the upper dense phase level L of the bed of catalyst C and the top of the reactor. In this disengaging space the major portion of the catalyst is separated from the vapors and gases and gravitates into the bed of catalyst C. However, before the gasiform and vaporiform material is withdrawn from reactor 2, it is forced through one or more "cyclones" 10 or other gas-solids separating devices wherein catalyst still entrained in the gasiform and vaporiform material is removed and returned to the bed of catalyst C through one or more dip pipes D. The gases and vapors are withdrawn from reactor 2, through line 41, thence passed through a cooler 42 wherein they are cooled to a temperature of about 750° F., thence passed via line 43 into a scrubber 44. In scrubber 44 catalyst still entrained in the product is withdrawn through line 45. A portion of this liquid in line 45 is recycled via line 46, pump 47, line 48, cooler 49 and line 50 into scrubber 44. There is withdrawn from scrubber 44 a raw product through line 51. This material is passed through a cooler 52 wherein it is cooled to a temperature of 100° F., thence passed via line 53 into a receiving drum 54. A gas rich in hydrogen is withdrawn from receiving drum 54, as previously described, through line 55, and a portion of this gas may be rejected from the system through line 57. Liquid product is withdrawn from vessel 54 through line 90.

Referring now to hydrofining or destructive hydrogenation reactor 3, a feed oil, such as a gas oil obtained from a catalytic cracking operation, is fed to the present system through line 58, thence heated in a furnace or suitable heating means 59 to a temperature of from about 600° to 850° F., and thence passed via line 60 into vessel 3 containing a fixed bed of pelletized catalyst, such as cobalt molybdate. A fluidized catalytic reactor may also be used. A hydrogen-containing gas from line 28 is passed via line 61 into a heating means such as furnace 62 where it is heated to a temperature of 600° to 950° F., and thence passed via line 63 into a reactor 3. In the reactor 3 under conditions more fully set forth hereinafter, sulfur-containing material is hydrogenated to form $H_2S$, and olefins present in the oil are hydrogenated. The hydrofined product is withdrawn overhead through line 64, cooled in a condenser 65, thence passed via line 66 into a separation drum 67 wherein gasiform material is passed overhead through line 68 into line 26 for return to reactor 1.

The gas in line 68 is rich in $H_2S$ because of the sulfur conversion in reactor 3. This gas is led through lines 7 and 9 back to reactor 1 where the $H_2S$ reacts with the molybdena of the catalyst to yield a low sulfur gas suitable for recycle to reactor 3 through the system previously identified. The desulfurized and saturated gas oil in 67 is withdrawn through line 69 as product.

Referring again to the regenerator 4, catalyst is withdrawn from reactor 1 through an inside stripper 70 formed by an internal vertical partition 91 wherein it is treated with steam or other inert gas introduced through line 71, and thence passed via line 73 to regenerator 4, conveying air being supplied by line 72. Simultaneously, catalyst is withdrawn from vessel 2 through stripper 75 formed by an internal vertical partition 92. Stripping gas is supplied by line 93. Stripped catalyst is passed through line 77 to regenerator 4, conveying gas being supplied by line 76. Secondary air is charged to regenerator 4, through line 78. In regenerator 4 catalyst from both reactors 1 and 2 is subjected to oxidative regeneration to convert carbonaceous and sulfur material into fumes which are withdrawn through line 79. As in the case of reactors 1 and 2 the catalyst in 4 is formed into a fluidized bed extending from a grid or other foraminous member G to an upper dense phase level L, above which upper dense phase level to the top of the reactor, there is a dilute phase suspension of catalyst in gasiform material which operates as a catalyst disengaging space. Before the regeneration fumes are withdrawn from regenerator 4, they are forced through one or more gas-solids separators or "cyclones" 10' wherein catalyst still entrained is separated from the fumes and returned to the fluidized bed of catalyst C through one or more dip pipes D. The hot regeneration fumes in line 79 may be treated to recover their sensible and chemical heat in preheating the feed or the recycle gas or otherwise employed in the system. Hot regenerated catalyst is returned to reactors 1 and 2 via lines 80 and 81, respectively.

EXAMPLE

A naphtha having the following inspection may be first treated in reactor 1 under the below conditions:

*Inspection of feed to reactor 1*

| | |
|---|---|
| Boiling range, ° F. | 210–325 |
| Vol. percent of naphthenes | 40 |
| Vol. percent of paraffins | 50 |
| Vol. percent of aromatics | 10 |
| Research octane number | 55 |

*Conditions in reactor 1*

| | Range | Preferred |
|---|---|---|
| Catalyst Composition | 5–12% $MoO_3$+2–7% Silica+Alumina. | 8% $MoO_3$+3% Silica+Alumina. |
| Temperature, °F | 860–925 | 880. |
| Pressure, p.s.i. | 200–500 | 300. |
| Space velocity, lbs. naphtha fed to reactor per hour per lb. of catalyst in reactor. | 0.5–1.5 | 1.0. |
| Standard cubic feet of hydrogen fed to reactor per barrel of oil fed to reactor. | 1,500–7,000 | 3,000. |
| Concentration of hydrogen fed to reactor 1, vol. percent. | 80–95 | 85. |

*Product obtained from reactor 1*

(Depending on conditions)

| | Range | Preferred |
|---|---|---|
| Research Octane Number | 75–85 | 80 |
| Vol. Percent $C_5$+ (based on feed) | 85–95 | 92 |
| Vol. Percent $C_4$ (based on feed) | 1–5 | 2 |
| Dry Gas, wgt. (Percent on feed) | 3–7 | 4 |

*Inspection of feed to reactor 2*

The feed to this reactor is a heart cut of the product obtained from reactor 1 boiling within the range of from 175°–375° F., preferably boiling from 225°–300° F.

*Conditions in reactor 2*

| | Range | Preferred |
|---|---|---|
| Catalyst | 5–12% $MoO_3$+2–7% Silica+Alumina. | 8% $MoO_3$+3% Silica+Alumina. |
| Temperature, °F | 880–960 | 915. |
| Pressure, p.s.i. | 200–500 | 300. |
| Space velocity, lbs. oil per hour per lb. catalyst. | 0.3–1.0 | 0.5. |
| Cubic feet of hydrogen fed to reactor 2 per barrel of oil fed to reactor 2. | 1,500–7,000 | 2,000. |
| Concentration of hydrogen in recycle gas fed to reactor 2. | 50–75 | 65. |

*Inspection of product recovered from reactor 2*

| | Range | Preferred |
|---|---|---|
| Research Octane Number | 90–102 | 97 |
| Vol. Percent $C_5$ | 80–95 | 85 |
| Vol. Percent $C_4$ | 2–7 | 4 |
| Dry Gas, wt. percent | 5–10 | 7 |

*Conditions in reactor 3*

| | Range | Preferred |
|---|---|---|
| Catalyst | 0.8 lbs. cobalt, 6.5 lbs. $MoO_3$, 100 lbs. alumina, activated at 1300°–1400° F. | |
| Temperature, °F | 600–850 | 675–700 |
| Pressure, p.s.i. | 200–500 | 300 |
| Space velocity, lbs. oil per hour per lb. catalyst in reactor. | 0.5–3.0 | 2.0 |
| Recycle gas, cu. ft. per barrel of oil to reactor 3. | 200–2,000 | 750 |

*Inspection of feed to hydrofiner 3*

| | Range | Specific Feed |
|---|---|---|
| Boiling range, °F | 400–750 | 400–650 |
| Sulfur, wt. percent | 1–7 | 2 |
| Bromine Number | 0–10 | 5 |

*Inspection of product recovered from hydrofiner 3*

| | Range | Specific Product |
|---|---|---|
| Sulfur, wt. percent | 0.2–0.5 | 0.3 |
| Bromine Number | 0 | 0 |

*Conditions in regenerator 4*

| | Range | Preferred |
|---|---|---|
| Temperature, °F | 950–1,200 | 1,100 |
| Pressure, p.s.i. | 200–500 | 300 |
| Residence time of catalyst, minutes | 2–10 | 5 |

To recapitulate briefly, the present invention relates to a multi-stage method of hydroforming naphthas in the presence of a fluidized catalyst under conditions such that a hydrogen-containing gas of high purity is obtained, which high purity gas is then utilized to either hydrogenate a gas oil containing sulfur and olefinic material to convert the latter to a saleable diesel fuel, or to treat the said gas oil under destructive hydrogenation conditions to valuable motor fuels. Residua may also be hydrogenated to produce primarily low sulfur catalytic cracking feed stock. One advantage of the invention is that the present process produces hydrogen which in modern refinery practice is a very essential reactant to be used to hydrodesulfurize gasoline and other oil refinery products. The usual method of producing hydrogen, or at least one commonly used in this country, is to reform methane or natural gas. In this operation, methane or natural gas is passed through tubes in a reformer furnace containing a catalyst such as nickel carried on kieselguhr or Portland cement. Steam is admixed with the natural gas or methane passed through the reformer furnace. This reaction must be carried out at a temperature of 1600° F. or higher. The tubes in the reformer furnace usually have a size of about 2" in diameter. Because the reaction is highly endothermic, it is very difficult to drive heat into the tubes in which the reforming reaction is taking place. As a result, this method of producing hydrogen is expensive. Furthermore, the products of the reaction of methane reforming are hydrogen and carbon monoxide. To separate the carbon monoxide from the hydrogen, it is necessary to pass the effluent from the methane or natural gas reformer after cooling through a water gas shift reaction wherein the gaseous mixture is treated with steam in the presence of a suitable catalyst, and the CO is converted to $CO_2$. Hence, the product from the water gas shift reaction consists of hydrogen and $CO_2$, which then must be treated with a liquid at low temperatures, such as an aqueous solution of diethanolamine to dissolve out the $CO_2$ and to recover hydrogen overhead from this treatment. It can thus be seen that this commercially practiced method of preparing hydrogen is cumbersome and expensive.

According to the present invention, a very rich hydrogen may be produced while at the same time upgrading naphtha. This hydrogen, which is produced as a result of the hydroforming operation, may be utilized to upgrade kerosene, gas oil, or even to convert middle oil, so-called, to motor fuel by destructive hydrogenation in the presence of suitable catalyst.

Another advantage of the invention is that the recycle gas from the hydrogenation reactor passes through a hydroforming reactor where the $H_2S$ therein is removed by reacting with the molybdena of the catalyst to molybdenum sulfide which is burnt off in the regenerator.

Many modifications of the present invention will appear to those who are familiar with the present art.

What is claimed is:

1. A hydrocarbon conversion process which comprises the steps of charging free hydrogen and naphtha to a first hydroforming zone containing a fluidized bed of a molybdenum oxide-containing hydroforming catalyst, maintaining mild hydroforming conditions in said zone, recovering a free hydrogen-containing gas substantially free of hydrogen sulfide and having a purity in the range of 80 to 95%, a hydroformed product having research octane number in the range of 75 to 85 containing a heart cut fraction boiling in the range of 175° to 375° F. from said first zone, separating the said heart cut by fractionation and subjecting said heart cut fraction to a second stage of hydroforming in the presence of a free hydrogen-containing gas in a second hydroforming zone containing a fluidized bed of the hydroforming catalyst, recovering from said second hydroforming zone a distillate fraction having a research octane number in the range of 90 to 102, continuously withdrawing and oxidatively regenerating said hydroforming catalyst from said zones in an external burning zone, continuously returning the regenerated molybdenum oxide-containing catalyst to said hydroforming zones, charging a sulfur-containing gas oil and a portion of said free hydrogen-containing gas from said first zone to a third zone containing a bed of hydrogenation catalyst, hydrogenating said gas oil therein, recovering from said third zone a distillate product containing less than 0.5 wt. percent sulfur and a hydrogen sulfide and free hydrogen-containing gas, and returning said last-mentioned gas to said first zone wherein the said last-mentioned gas is substantially freed of sulfur by interaction of the hydrogen sulfide with the molybdenum oxide-containing hydroforming catalyst during hydroforming of the naphtha to provide a substantially sulfur-free hydrogenating gas for use in hydrogenating said gas oil.

2. The process of claim 1 wherein said hydrogenation catalyst contains cobalt and molybdenum.

3. An improved multi-stage hydrocarbon conversion process which comprises the steps of hydroforming in a first conversion a naphtha in the presence of molybdenum oxide-containing catalyst and 1,500 to 7,000 std. cu. ft./bbl. of a hydrogen sulfide and free hydrogen containing gas having a hydrogen purity in the range of 80 to 95%, said hydroforming being conducted at a temperature in the range of 860° to 925° F., a pressure in the range of 200 to 500 p.s.i. and a space velocity in the range of 0.5 to 1.5, recovering from the vaporous effluent from said first zone liquid product having a research octane number in the range of 75 to 85, a first free hydrogen-containing gas substantially free of hydrogen sulfide and a heart cut fraction boiling in the range within the limits of 175° to 375° F., further hydroforming in a second conversion zone said heart cut fraction in the presence of a molybdenum oxide-containing catalyst and 1,500 to 7,000 std. cu. ft./bbl. of gas containing 50 to 75% free hydrogen at a temperature in the range of 880° to 960° F., a pressure in the range of 200 to 500 p.s.i. and a space velocity in the range of 0.3 to 1.0, recovering from the vaporous effluent from said second zone liquid product having a research octane number in the range of 90 to 102, continuously withdrawing catalyst from both of said zones, regenerating the catalyst so withdrawn by burning in contact with a free oxygen-containing gas at a temperature in the range of 950° to 1200° F. to remove sulfur and carbonaceous deposits, returning molybdenum oxide-containing catalyst so regenerated to said zones, hydrogenating in a third conversion zone in the presence of a hydrogenating catalyst a distillate gas oil boiling in a range within the limits of 400° to 750° F. and containing 1 to 7 wt. percent sulfur using said first free hydrogen-containing gas in amounts in the range of 200 to 2000 std. cu. ft./bbl. as a source of hydrogen, said hydrogenation being conducted at a temperature in the range of 600° to 850° F., a pressure in the range of 200 to 500 p.s.i. and a space velocity in the range of 0.5 to 3.0, recovering a desulfurized distillate oil containing less than 0.5 wt. percent sulfur and a hydrogen sulfide and free hydrogen-containing gas from said third zone, and returning said last-mentioned gas to said first conversion zone to be resulfurized therein, whereby extraneous hydrogen sulfide removal facilities are not required.

4. In a process wherein a naphtha is subjected to hydroforming in a hydroforming zone containing a fluidized bed of a molybdenum oxide-containing hydroforming catalyst which is continuously circulated from the dense fluidized bed in said hydroforming zone to a dense fluidized bed in a regeneration zone where inactivating carbonaceous and sulfur-containing compounds are converted in an oxidative regeneration step whereupon the regenerated molybdenum oxide-containing catalyst is recirculated to the hydroforming zone and a hydrogen rich gas substantially free of sulfur is separated from the hydroformed product, the improvement comprising charging the hydrogen separated from the hydroformed product from said hydroforming zone and a gas oil containing sulfur to a hydrodesulfurization zone containing a hydrodesulfurization catalyst, maintaining hydrodesulfurization conditions in said hydrodesulfurization zone, recovering from said zone a gas oil product containing less than ½% by weight of sulfur and a gas containing hydrogen sulfide and free hydrogen and returning said gas to the said hydroforming zone wherein the said gas is substantially freed of sulfur by interaction of the hydrogen sulfide with the hydroforming catalyst during hydroforming of the naphtha to provide a substantially sulfur-free hydrogenating gas for use in hydrodesulfurizing said gas oil.

5. A hydrocarbon conversion process which comprises the steps of charging free hydrogen mixed with hydrogen sulfide gas and naphtha to a hydroforming zone containing a fluidized bed of molybdenum oxide-containing catalyst, maintaining in said zone a temperature in the range of 850° to 925° F. and a pressure of 200 to 500 p.s.i. to obtain mild hydroforming of the naphtha liberation of hydrogen from the hydrogen sulfide, recovering from vaporous effluent of said zone free hydrogen-containing gas substantially free of hydrogen sulfide, continuously withdrawing sulfided catalyst from said zone to a regeneration zone, regenerating the catalyst so withdrawn with oxygen-containing gas to remove sulfur and carbonaceous deposits, continuously returning the regenerated molybdenum oxide-containing catalyst to said hydroforming zone, charging a sulfur-containing hydrocarbon oil with a portion of said free hydrogen-containing gas from said hydroforming zone to a hydrofining zone containing cobalt molybdate as a hydrogenation catalyst, maintaining hydrodesulfurization conditions in said hydrofining zone containing the hydrogenation catalyst, maintaining mild hydrogenating conditions of 600° to 850° F. and a pressure of 200 to 500 p.s.i.

References Cited in the file of this patent

UNITED STATES PATENTS

| | | |
|---|---|---|
| 2,348,557 | Mattox | May 9, 1944 |
| 2,604,438 | Bannerot | July 22, 1952 |
| 2,717,860 | Rex | Sept. 13, 1955 |